United States Patent

[11] 3,596,070

[72] Inventors John M. McCool
Altadena;
Shelby F. Sullivan, Arcadia; Robert H. Hearn, Altadena; Michael S. Ball, Pasadena, all of, Calif.
[21] Appl. No. 882,984
[22] Filed Dec. 8, 1969
[45] Patented July 27, 1971
[73] Assignee The United States of America as represented by the Secretary of the Navy

[54] WINCH CONTROL SYSTEM FOR CONSTANT LOAD DEPTH
7 Claims, 5 Drawing Figs.
[52] U.S. Cl. .................................................. 235/151,
114/235 B, 254/173 R
[51] Int. Cl. .................................................. G06g 7/78
[50] Field of Search .......................................... 235/150.2,
151, 151.32; 340/29, 177; 115/6, 6.1; 114/235.2;
254/173 R, 173 B

[56] References Cited
UNITED STATES PATENTS
2,729,910 1/1956 Fryklund ...................... 114/235.2 X
2,829,329 4/1958 Silva .............................. 235/151 X
3,351,895 11/1967 Cupp et al. .................... 114/235.2 X
3,469,821 9/1969 Gross et al. ................... 114/235.2 X Primary Examiner—Malcolm A. Morrison
Assistant Examiner—Jerry Smith
Attorneys—Richard S. Sciascia, Ervin F. Johnston and John Stan ABSTRACT: A winch control system for operating a winch stationed on a vessel, and for stabilizing a load, which is connected by a cable to a traction unit driven by a prime mover, at a constant height above the sea floor irrespective of the vertical motion of the vessel due to wave action, thereby controlling the motion of the cable. A cable dynamics sensor, connectable to the cable between the traction unit and the load, generates output signals proportional (1) to its depth, and (2) to its velocity relative to the vessel. A tachometer, connectable to the traction unit, produces a signal which is proportional to the velocity of the cable relative to the vessel. A depth-velocity summing circuit, connected to the cable dynamics sensor, is adapted to be connected to a sensor depth order signal, generated by a control console on the vessel, for summing the sensor depth and depth order signals, and is connected to the cable dynamics sensor and tachometer for summing the sensor velocity signal and the cable velocity signal. The two depth and two velocity signals, after being summed, produce an output control signal. A torque control, adapted to be connected from the output of the depth-velocity summing circuit to the prime mover, develops a torque signal proportional to the control signal, to cause the traction unit to null the control signal, thereby controlling the load position and velocity.

PATENTED JUL 27 1971 3,596,070

INVENTORS
JOHN M. McCOOL
SHELBY F. SULLIVAN
BY ROBERT H. HEARN
MICHAEL S. BALL
Ervin F. Johnston
ATTORNEY
John Stan
AGENT

WINCH CONTROL SYSTEM FOR CONSTANT LOAD DEPTH

STATEMENT OF GOVERNMENT INTEREST

The invention described herein may be manufactured and used by or for the Government of the United States of America for governmental purposes without the payment of any royalties thereon or therefor.

This invention relates to a winch control system, stationed on a vessel, for maintaining a load, connected by a cable to the winch control system, at a constant depth below the mean sea surface, irrespective of the vertical motion of the ship due to wave action. It is not known if there are any systems of this type in the prior art.

This invention relates to a winch control system to hold a load at a nearly constant depth below the mean sea surface compensating for the ship's motion with cable motion. The implementation of the winch control system for achieving this load positioning constitutes the invention.

This winch control system implementation is as follows:

The prime cable mover is a variable-stroke hydraulic motor, which drives a pair of capstans and is fed from a constant pressure source, resulting in a device with torque on the capstans proportional to the stroke. The torque in turn is determined by the magnitude of the electrical signal fed to a torque control from a summing amplifier, herein termed a depth-velocity summing circuit.

The summing amplifier takes together all inputs from the system sensors to create an error signal which drives the capstan to null the error, and hence control the load position and velocity.

The sensors and the signals they provide for system control are the following:

1. The rate or velocity at which the cable wound around the capstans moves is measured by a tachometer, and an electrical signal proportional to this rate is fed into the summing amplifier. This signal represents the rate of cable motion relative to the ship.

2. The cable dynamics sensor is a package rigidly attached to the cable, at a depth approximately 300 feet below the mean surface of the ocean. This depth is a compromise between being deep enough so that the effect of passing waves does not significantly alter the pressure (depth) readings at the sensor, yet shallow enough so that the mechanical delay of cable motion between the capstan and the sensor is not great enough to cause system instability problems. There are two outputs from the sensor package, one proportional to the depth of the sensor, and one proportional to the acceleration of the sensor, the latter being integrated to produce a velocity signal.

3. A constant signal from a control console, proportional to the nominal depth at which the sensor package is to operate.

It is the choice and combination of these signals which allow the system to operate successfully. Of particular importance was the choice of the acceleration term in the sensor package.

A stability analysis of the winch control system indicated that a signal proportional to the rate at which the cable dynamics sensor, and hence the cable, was moving vertically was critical to achieving stability in the system. The first attempt at providing this signal was through electronic differentiation of the depth signal. This resulted in a signal too corrupted with noise to be useful in the system. Since differentiation is inherently a noise-increasing process, amplifying higher frequency signals with respect to lower frequency signals, this was not surprising.

The alternative was to measure the acceleration of the sensor directly, and integrate this signal electronically once to provide a rate signal. This resulted in a relatively noise-free signal which was quite usable. There was no way found to measure the rate of the sensor directly, since all known devices for this job have time-lags between the time they start moving and the time the signal actually represents the velocity.

In operation, then, the system functions in this manner:

a. The load is deployed and the cable dynamics sensor package taken to near its desired depth.

b. A control order, or depth order, signal is set into the system from the console for the desired nominal position or depth of the sensor.

c. The system is turned into a constant depth mode of control, where the sensor outputs cause capstan motion.

In this mode, if the sensor is too deep relative to the order signal, by say 10 feet, there will be an error signal at the output of the summing amplifier corresponding to the 10-foot error, which will cause the capstan to rotate in a direction which will cause it to take in cable. The capstan will come to speed until the capstan rate signal is just sufficient to balance the combination of the depth error signal and the sensor rate, bringing the sensor to the correct depth at a controlled speed, the speed being greater as the error in depth of the sensor is greater. As the sensor achieves the correct depth, the capstan will slow, and finally stop when the sensor is correctly positioned.

Should the vessel rise up on a wave, the sensor outputs will indicate both the change in sensor depth with respect to the means sea surface, and the rate at which it is changing. The summing amplifier output will cause the capstan to rotate in a direction to let cable out at the rate needed to return the sensor to its nominal depth and zero velocity. Due to the finite gain of the servo loop, there will always be some small error in the sensor position and it may have some motion. With the gains implemented and tested in the system, the sensor position error would be held to within less than 1 foot, and its velocity to within much less than 1 foot per second with the ship riding a state 6 sea (ship excursions about ±6—8 feet, or 12—16 feet peak-to-peak amplitude).

For a vessel riding the trough of the wave, the results would be the same, with changes in direction.

The cable tension was monitored as a safety feature, and brakes take effect in the system if the tension goes too high or low. This braking apparatus is not essential to the winch control system.

Accordingly, an object of the invention is the provision of a control system for a winch which is capable of maintaining a load at a constant depth below the mean surface of the ocean.

Another object is to provide a winch control system compensating for both the displacement of the load and the rate of displacement, or velocity, of the load.

A further object of the invention is the provision of a winch control system which is substantially noise-free.

Other objects and many of the attendant advantages of this invention will be readily appreciated as the same becomes better understood by reference to the following detailed description, when considered in connection with the accompanying drawings, in which like reference numerals designate like parts throughout the figures thereof and wherein.

Before discussing the figures in detail, a few of the features of the winch, of which the winch control system is a part, will be enumerated.

The winch has the following significant design features:

a. The cable is controlled at all points in the system to avoid both slacking and overtensioning, with tension control and use of a cable accumulator.

b. The winch is hydraulically powered with proportional torque control through variable displacement hydraulic motors operating from a constant-pressure source.

c. The hydraulic energy is controlled with high-band-width, closed loop components. Care was taken to keep the system as linear and controllable as possible.

d. The winch is designed to compensate for ship's motion by paying cable in and out as the ship falls and rises. This maintains the load at a substantially constant depth below the mean sea surface.

e. The hydraulic system can store significant amounts of energy at points where high-peak power may be demanded. This reduces transient power loads on the ship's electrical generators, and improves system response.

f. Energy is dissipated directly by cooling heated oil at a low pressure.

g. Complete control of the winch is carried out from a remote console, located on a vessel.

Figure 1:
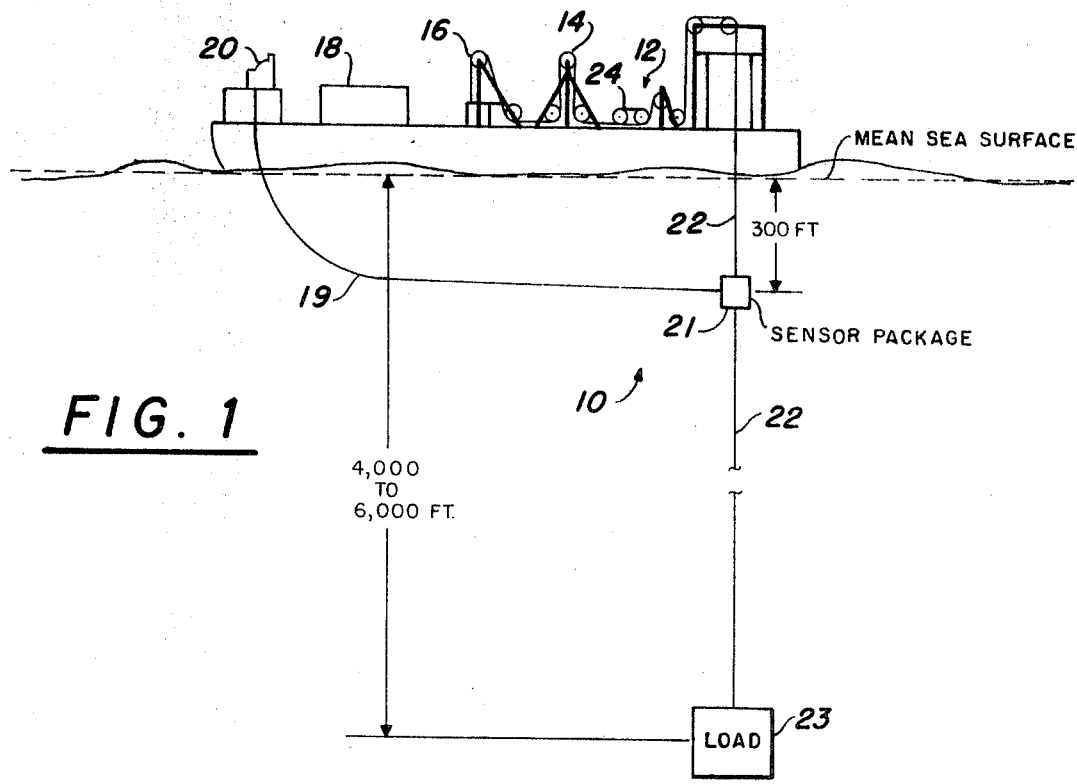
FIG. 1 is a pictorial view of the complete winch, with a sensor package as a key part of the winch control system.

Referring now to the drawings, wherein like reference numerals designate like or corresponding parts throughout the several views, there is shown in FIG. 1 a winch system 10, which consists of five units: the traction unit 12, cable accumulator 14, storage drum 16, hydraulic power supply 18, and the control console 20. A sensor package 21, a key element of the invention, will be described more fully in connection with FIG. 3.

The traction unit 12 basically consists of a pair of capstans 24 grooved to take five wraps of cable 22. It is driven through a gear reduction box (See FIG. 5) by a 150 hp. hydraulic motor with proportional torque control. This unit is the "working" unit in the system, developing the torque required to hold and accelerate the load 23.

Maximum line tension is 8,000 lbs.; maximum line rate is 25 ft./sec. (15 knots); maximum acceleration (no load) is 250 ft./sec.²; and minimum load position increment is less than one-half inch at full load.

The cable accumulator 14 is a passive cable storage device located between the traction unit 12 and the storage drum 16.

To achieve maximum load control, the traction unit 12 should be able to accelerate as rapidly as possible. The inertia of the rotating components of the traction unit 12 can be kept low enough so that, with reasonable motor torque, high acceleration can be achieved. The storage drum 16, however, has an inherent inertia at least 10 times that of the traction unit 12. In order for the drum 16 to accelerate with the capstan 24, a proportionately greater torque would be required. The amount needed cannot reasonably be provided within the range of the design parameters of this winch 10, consequently paying cable in and out would result in slacking and overtensioning the cable 22 between the traction unit 12 and the drum 16. It is therefore necessary to either decrease the acceleration of the traction unit 12 to whatever the drum 16 can manage, or to put a buffer between the units. The cable accumulator 14 serves as the buffer.

Figure 2:
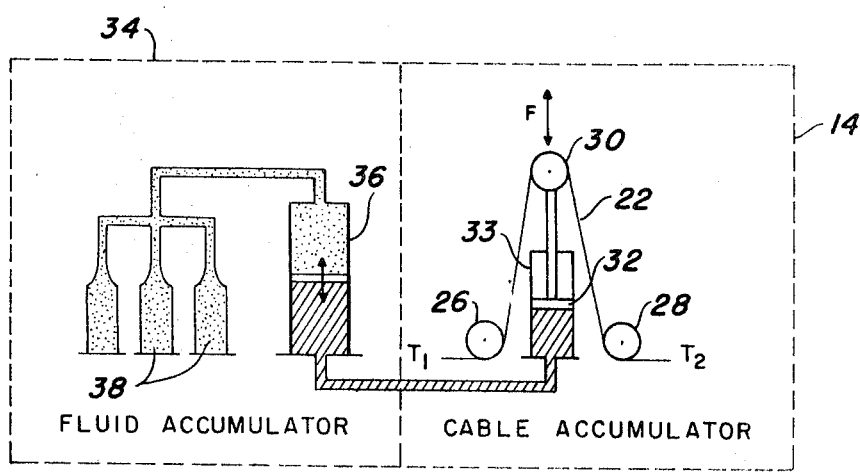
FIG. 2 is a cross-sectional diagrammatic view of a pressure source, in the form of a fluid accumulator, for a cable accumulator, both being important elements of the winch system.

The cable accumulator 14, shown in greater detail in FIG. 2, is conceptually simple. It takes in or pays out cable to the traction unit 12 or the storage drum 16 at a nearly constant tension. The rate and amount of cable 22 handled from either side are controlled independently.

During operation, as the traction unit 12 accelerates to pay out cable, cable initially comes from the cable accumulator 14. As the accumulator 14 is emptied, the storage drum 16 begins feeding cable in. The storage drum 16 eventually reaches the speed or position required to hold the accumulator 14 half full. For hauling in cable, the operation is analogous. Thus, with the cable accumulator 14 to act as a buffer, the winch system 10 can include a large, heavy, drum load of cable, while maintaining a high acceleration capability at the traction unit 12.

The storage drum 16 consists of a flanged drum which can store 10,000 feet of ½-inch cable, and is driven through a gear reduction box by a 50 hp. hydraulic motor with proportional torque control. A Lebus spooling system and a fleet-angle compensator are used on the storage drum.

The hydraulic power supply 18 is the source of all oil used by the traction unit 12 and the storage drum 16. It contains an oil reservoir, pumps, and heat exchanger required for this system.

The control console 20 provides complete remote control and monitoring of the winch system 10, by means of the signal carrying cable 19 (FIG. 1). A monitor panel gives all pressures, torques, rates, and line tension, as well as load depth and attitude.

Discussing now FIG. 2 in more detail, the winch may be considered a constant-tension winch, that is, its output is meant to have a constant tension. The cable accumulator 14 is a device which takes in or pays out cable, from either side, at a nearly constant tension. The cable accumulator 14, which is situated between the storage drum 16 and the traction unit 12, and operates to control the cable tension in that region, but it does not affect the tension of the cable 22 as the cable is payed out to the load. In the model shown in FIG. 2, the two sheaves 26 and 28 at the bottom are fixed and the top sheave 30 can move up and down. The top sheave 30 is supported on a hydraulic piston 32, moving in a vertical direction in a cylinder 33, which exerts an upward force, $F$. If the weight of the top sheave 30 and its support is $W$, then the cable tension is $T=(F-W)/2$   (1) when the system is at rest. As the top sheave 30 moves up 1 foot, it will pull in 2 feet of cable 22, from either or both sides. As the sheave 30 comes down 1 foot, it lets 2 feet of cable return. Thus, if the tension in the cable 22 increases above $T$, cable is taken from the accumulator 14; if the tension drops below $T$, the accumulator will take cable in.

The accumulator 14 actually used in the winch 10 is simply a row of nine of the simple three-sheave models 14, shown in FIGS. 1 and 2, placed side-by-side. The top block of sheaves, similar to sheave 30, has a total travel of 5 feet, so the dynamic cable capacity of the unit is 90 feet.

It is important to note that no accumulator 14 of this type can maintain a constant tension in the cable 22, due to the mass and the inertia of the movable components. If the top sheave 30 and support have mass M and sheave moment of inertia I, and the cable 22 has acceleration A, then the dynamic cable tension can be found from the following equations:

$$(F-W)-(T_1+T_2)=\frac{MA}{2} \qquad (2)$$

or $$T_1+T_2=(F-W)-\frac{MA}{2} \qquad (3)$$

due to the vertical acceleration, where $T_1$ and $T_2$ are the tensions defined in FIG. 2, and $$R(T_1-T_2)=\frac{2IA}{4\pi R^2} \qquad (4)$$

or $$T_1-T_2=\frac{2IA}{4\pi R^2} \qquad (5)$$

where $R$ is the sheave radius, to accelerate the sheave in rotation. $T_1$ is added to $T_2$ in Eqs. (2) and (3) because in this case the top sheave 30 is moving vertically, and both ends of the cable 22 at reference symbols $T_1$ and $T_2$, representing tensions, are simultaneously being let out or pulled in. Tension $T_2$ is subtracted from tension $T_1$ in Eqs. (4) and (5) because the sheave 30 is rotated, and tension $T_2$ is opposed to tension $T_1$.

In units operating at high acceleration, these tension error terms can amount to hundreds of pounds. An additional tension error will exist as a function of top sheave 30 position, if the pressure in the hydraulic cylinder 32 is not kept constant. In a unit actually built, this pressure is held quite accurately by the scheme shown in FIG. 2.

In the fluid accumulator 34, the oil pressure in the fluid cylinder 36 is balanced by the nitrogen pressure in the cylinder and in the nitrogen storage bottles 38. As the piston 32 travels from top to bottom in the hydraulic cylinder, the amount of oil (or nitrogen) displaced is small compared to the total volume under pressure, hence the pressure change is small.

Discussing now in detail the mode of winch operation wherein it is desired to maintain the load 23 at a constant depth below the mean sea surface, in the course of taking data from instrument packages suspended in the ocean, it is often desirable to cancel out the motion of the ship or vessel on the surface so that the load 23 remains relatively still, with respect to a vertical direction.

Control of the winch 10 in this constant-depth mode is conceptually quite straightforward. In order to hold the load 23 at a constant depth, the winch 10 must pay out cable 22 as the vessel rises on a wave, then take cable in as the ship falls, with the amount and rate of cable motion just compensating for ship's motion.

Referring back to FIG. 1, the constant depth operation is as follows: The traction unit 12 is under control of the depth sensor, or sensor package, 21 through the control console 20. The depth sensor 21 is attached firmly to the winch cable 22 at a depth of approximately 300 feet. This depth is great enough so that surface waves cannot cause a significant error in the depth sensor output, yet shallow enough so that the mechanical delay down the winch cable 22 will not disrupt system stability. The depth transducer, which is part of the sensor package 21, is capable of resolving a change in its depth to within less than 1 inch in 300 feet.

As the ship rises on a wave, the depth sensor will be pulled up by the cable 22. This produces an error signal which causes the traction unit 12 to pay out cable 22 in order to return the sensor to its nominal depth. As the ship comes down, the sensor package 21 will drop, causing the traction unit 12 to take in cable 22, again returning the sensor to its nominal depth. Holding the depth sensor at a constant depth relative to the mean ocean surface will maintain the load 23 at a relatively constant depth. The system is designed to operate under conditions of up to at least sea state 6 (wave heights to 30 feet) with sensor motion attenuated from the ship's motion by a factor greater than 100.

During the constant-depth mode, the storage drum 16 is controlled by the cable accumulator 14. The storage drum 16 is not ordered to turn unless the cable accumulator 14 is nearly full or nearly empty. This means that as the traction unit 12 pays cable 22 in and out, compensating for the ship's motion, cable is taken from and stored in the cable accumulator 14 and the drum 16 remains still.

Figure 3:
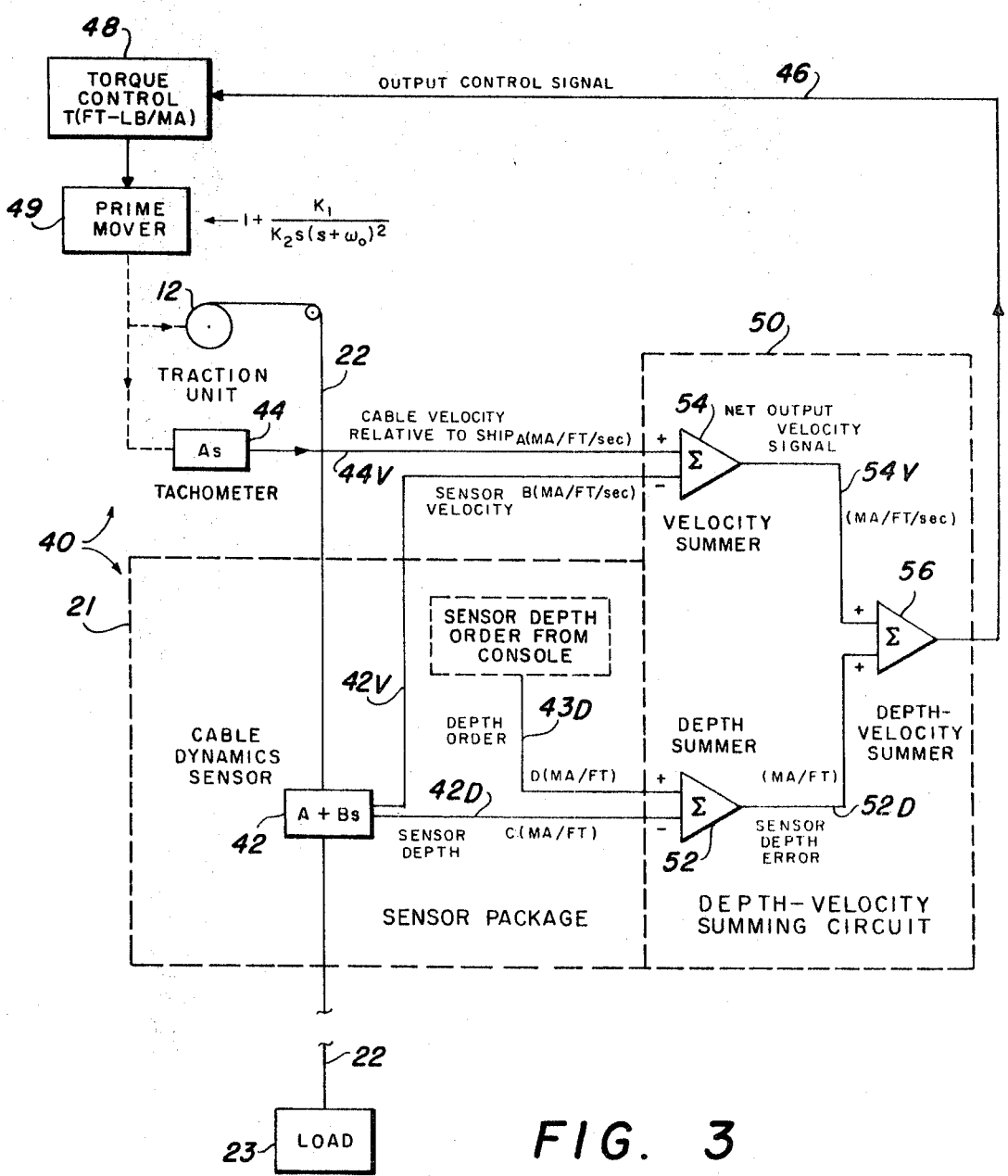
FIG. 3 is a circuit diagram of the major servo loop of the winch control system.

Referring now to FIG. 3, this figure shows a winch control system 40, for operating a winch stationed on a vessel, and for stabilizing a load 23 which is connected by a cable 22 to a traction unit 12 (FIG. 1) driven by a prime mover (not shown), at a constant depth below the mean sea surface irrespective of the vertical motion of the vessel due to wave action. The winch control system 40 includes, as a key element, a cable dynamics sensor 42, a component of the sensor package 21, connectable to the cable 22 between the traction unit 12 and the load 23 for generating output signals proportional (1) to its depth, and (2) to its velocity relative to the vessel. The cable dynamics sensor 42 contains an accelerometer and an integrator within it, and is therefore able to sense velocity. It also contains a pressure gauge, and is therefore able to measure depth.

A tachometer, 44, connectable to the traction unit 12, has the purpose of producing a signal which is proportional to the velocity of the cable 22 relative to the vessel. A depth-velocity summing circuit 50, connected to the cable dynamics sensor 42, is adapted to be connected to a sensor depth order signal 43D, generated by the control console 20 on the vessel, for summing the sensor depth 42D and the depth order signals, and connected to the cable dynamics sensor and tachometer 44 for summing the senor velocity signal 42V and the cable velocity signal 44V, and then summing the two depth and the two velocity signals to produce an output control signal 46. A torque control 48 is connected from the output 46 of the depth-velocity summing circuit 50 to the prime mover 49, for developing a torque signal proportional to the control signal, to cause the traction unit 12 to null the control signal, thereby controlling the load position and velocity.

In the winch control system 40 of FIG. 3, the depth-velocity summing circuit 50 consists of the following three summers:

a. a depth summer 52 for generating a depth error signal;

b. a velocity summer 54 for generating a velocity error signal; and c. a depth-velocity summer 56, having as its two inputs the depth and velocity output error signals, and generating the output control signal 46.

The depth velocity summing circuit 50 would be on board the vessel and connected by the cable 19 (FIG. 1) to the sensor package 21.

Discussing now quantitatively the signals of the servo loops shown in FIG. 3, the cable dynamics sensor 42 generates a signal 42D in A ma. per foot corresponding to the depth at which it is located, for example 300 feet, which depth may be measured by a hydrostat, an element of the cable dynamics sensor 42.

The sensor depth order is a signal communicated from the control console 20. It is chosen to also generate an output signal in A ma. per foot, and is a function of the difference between the actual depth at which it is located and the desired depth for its location.

An example of the function of the sensor depth signal 42D and the depth order signal 43D is the following: Assume that when the cable dynamics sensor 42 is at 300 feet, it generates a sensor depth signal current 42D of +10 ma. The depth order signal 43D generated by the control console 20 on the vessel will, providing that the desired depth for the cable dynamics sensor 42 is 300 feet, also be a signal current of 10 ma., but of the opposite sign, or direction. These two signals of the same magnitude but of opposite polarity are summed together in the depth summer 52, with a net sensor depth output signal 52D of 0 ma.

Now, if the cable dynamics sensor 42 should drop below its desired depth of 300 feet, by, say 5 feet, it will generate a sensor depth signal 42D of, say, −50 ma., which would make the constant A equal to 10. Since the depth order signal 43D generated by the console 20 is constant during any single operation, the output signal, the sensor depth error signal 52D, generated by the depth summer 52, will now be equal to −40 ma. In effect, the depth summer 52 cancels out the average value, +10 ma. in this instance, and generates a depth output signal 52D equal to the error signal.

Assuming that the cable dynamics sensor 42 is not in motion at this time, both velocity inputs 42V and 44V to the velocity summer 54 are equal to zero, making the net output velocity error 54V equal to zero. Therefore, the only input signal to the depth-velocity summer 56 is the −40 ma. error signal due to the cable dynamics sensor 42 being 5 feet lower than it should be. Hence, the output control signal 46 to the torque control 48 would be of such a nature that it would cause the capstan to exert sufficient torque to rotate by a certain angle sufficient to lift the cable dynamics sensor 42, and therefore the load 23, by 5 feet. That is, cable 22 is hauled upwardly, since the load 23 was too deep.

The winch control system 40 for maintaining a load 23 at a constant depth below the mean sea surface may also compensate for the acceleration of the load and reduce the error in the acceleration to zero. However, due to noise problems, it was found that a velocity-error, rather than acceleration-error, system was much easier to implement. The acceleration of the cable 22 wound around the pair of capstans 24 was therefore integrated once to result in a velocity signal 44V relative to the ship.

The cable dynamics sensor 42, in addition to a hydrostat for measuring pressure, also contains an accelerometer to measure the vertical acceleration of the load 23. This acceleration is integrated once to produce a sensor velocity signal 42V.

It should be noted that the sensor velocity signal 42V produced by the cable dynamics sensor 42 is relative to the means surface of the water, while the cable velocity signal 44V is relative to the vessel.

It is also to be noted that the output control signal 46 is an error signal, say, of 40 ma., which may be due to an error in depth only, an error in velocity only, or some combination of the two. In a manner of speaking, the torque control unit 48 "sees" an error signal current of 40 ma., but does not know its composition. Nevertheless, such systems utilizing both position and rate feedback work quite well.

As the load 23 is hauled up for any reason, there is caused a cable acceleration with respect to the ship, which is integrated to produce a rate signal 44V which is fed to the velocity summer 54. The movement of the load 23 upward also produces a rate signal 42V. Both rate signals 42V and 44V are fed to the velocity summer 54, thus producing a net output velocity signal 54V, which gets smaller and smaller as the load 23 approaches its desired position. The rate feedback due to both sources stabilizes the circuit 40.

The whole loop response gives the result that, as the cable dynamics sensor 42 comes back to its nominal position of 300 feet, in the example given, the depth error sum 52D approaches zero, and both rate terms 42V and 44V will gradually decrease to zero. The load 23 approaches its nominal position, as determined by the sensor depth order signal 43D, in a damped manner.

While there is a time delay between the instant of time when the sensor package 21 starts to move in a vertical direction and the time when the cable 22 is released or taken in, it should be noted that, as is typical of servosystems of this type, the electrical and mechanical components are connected together in a common feedback system, and the delays are accounted for in the design of the overall system.

An electrical signal may be sent to a mechanical component faster than the speed with which the component may respond, but because the reaction of the electrical components in the feedback loop are tied to the reaction of the mechanical components, they all work together with acceptable delays.

Summarizing the function of the depth-velocity summing circuit 50, it determines the error in two depth input signals 42D and 43D, and the error in two velocity input signals, 42V and 44V and sums the two errors, in depth and velocity, to produce an output control error signal 46 which applies a torque to the traction unit 12, to result in a capstan 24 rotation and angular velocity which tends to reduce the two errors to zero. The error output signal 46, in terms of the Laplace transform, is of the form $(k_1 + k_2 s)$.

Inasmuch as the three summing circuits, the depth summer 52, the velocity summer 54, and the depth-velocity summer 56 are all linear circuits, they could be combined into one circuit, the depth-velocity summing circuit 50, as shown in FIG. 3 by the dashed lines, with four inputs, 42D, 43D, 42V, and 44V and one output signal 46.

The Laplace transform for the overall circuit shown in FIG. 3 involves a fifth-order term in $s$. However, the overall transfer function may be simplified to the following second-degree equation:

$$L(s) = 1 + \frac{mR^2}{J}\left[\frac{RM_0\left[(B - \frac{mR}{J}A)s + c\right]}{Js^2\left(\frac{1}{G} + K\right) + M_0 As}\right] \quad (6)$$

$m$ = mass of the load and cable in the water. 40 $m$ 100 slugs in this application, depending on the amount of cable reeled out.

$R$ = radius of capstans carrying the cable ( 12 inches)

Figure 5:
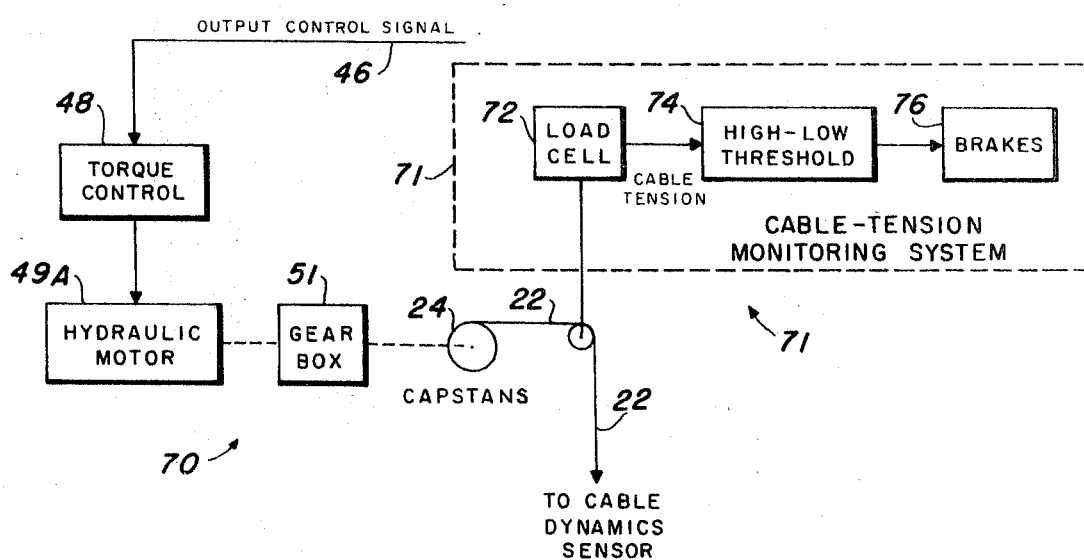
FIG. 5 shows an optional braking arrangement to ensure that the cable tension is maintained within safe operating limits.

$J = 25$ slug-ft.$^2$ = Moment of inertia of all rotating components, reflected to motor shaft side of gearbox 51 (FIG. 5)

$M_0 \cong 100$ ft.-lb./ma. = Torque response of motor 49A to error signal, and is further defined in connection with equation (8)

$A \mathrel{/\!\!=} 10$ ma./ft./sec. = Capstan velocity 44V feedback term $B \cong 8$ ma./ft./sec. = Sensor velocity 42V feedback term $C \cong 10$ ma./ft. = Sensor position feedback $D \cong 10$ ma./ft. = Depth order term 43D from console (not a term in the above equation (6)

$G = G(s)$ is defined by equation (9), below $k$ = feedback gain of torque control ($K \cong 10\mu$amp./ft.-lb.)

This equation (6) does not describe the motion of the cable dynamics sensor 42, but rather the degree with which the sensor motion is diminished relative to the ship's motion. Equation (6) for $L(s)$ measures the attenuation for the ship's motion in terms of the capstan 12 motion, just as though the system 40 were a single loop.

Figure 4:
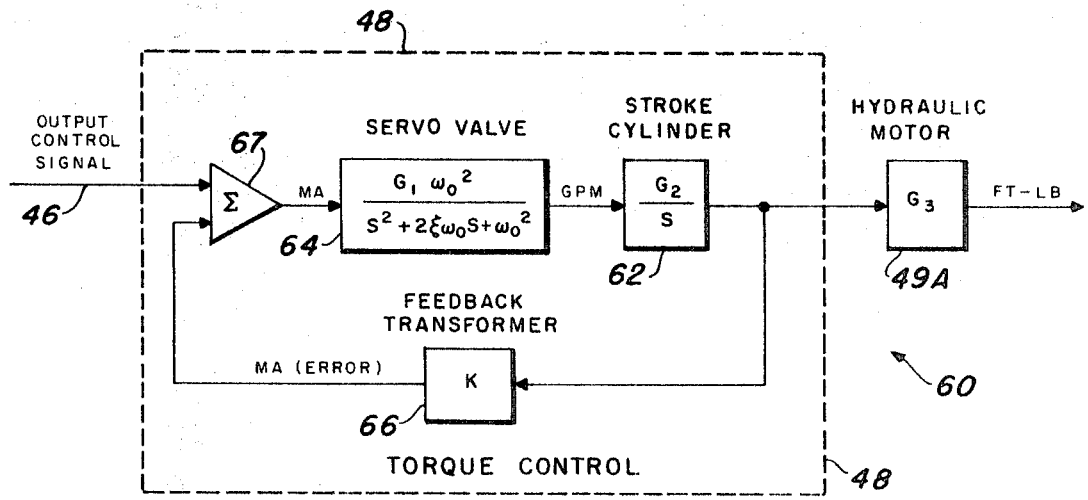
FIG. 4 is a circuit diagram of a minor servo loop around the motor used as a prime mover.

Discussing now FIG. 4, this figure shows the torque control 48 to consist of a stroke cylinder 62 controlled by a servo valve 64, with a feedback transformer 66 feeding the output back into the input through a feedback transformer 66. The output control signal 46 goes to the torque control unit 48, which controls a prime mover 49, which, in one embodiment was a hydraulic motor 49A. The denominator of the transfer function of the servo valve 64 is written in the standard form for a second degree servo function.

The loop effectively gives a torque out of the motor 49A as a linear function of the drive signal, the output control signal 46. The closed-loop response of the control circuit 60 is $$\frac{T_{out}}{\text{Drive}} = \frac{G_0 \omega_0^2}{s^2 + 2\xi\omega_0 s + \omega_0^2(1 + KG)} \text{ (ft.-lb./ma.)} \quad (7)$$

where $$G_o = G_1 \times G_2$$

$$M_o = G_1 \times G_2 \times G_3 \times \omega_o^2 \quad (8)$$

$\omega_o$ is the natural frequency of the servo valve 64, approximately 60 c.p.s. in one embodiment.

$G_1$ = Servo valve gain (GPM/ma.)

$G_2$ = Stroke cylinder gain (FPS/GPM)

$G_3$ = Hydraulic motor gain (Ft.-Lb./Ft.)

The open-loop form of the equation describing the ratio of load-motion to ship-motion (assuming stiff cable) is $$\frac{M_L}{M_0} = \frac{-\left[1 + KG(s) + \frac{M_0}{Js^2}G(s)As\right]}{1 + KG(s) + \frac{M_0}{Js^2}G(s)As + \frac{mR^2}{J} + \frac{M_0 R}{Js^2}G(s)(Bs + C) + KG(s)\frac{mR^2}{J}}$$

(9)

where $$G(s) = \frac{G_0 \mu_0^2}{s(s^2 + 2\xi\omega_0 s + \omega_0^2)} \quad (10)$$

$G(s)$ is the transfer function of the forward-loop of the servovalve 64 and the hydraulic stroke cylinder controlling torque on the capstan hydraulic motor 49A, with $K$ being the feedback gain of feedback amplifier 66 on this minor loop 60.

Referring now to FIG. 5, this figure shows, in block diagram form, a winch control system wherein the prime mover may further comprise the hydraulic motor 49A with proportional torque control 48, as shown in the previous figure, controlled by the output of the torque control; and in addition may comprise a gear reduction box 51, driven by the hydraulic motor, whose output is connected to the capstans 24.

Also shown in FIG. 5, as an optional part of the winch system, is a cable-tension monitoring system 71 which includes a load cell 72 which makes contact with and senses the tension in the cable 22. A high-low threshold device 74, connected to the load cell 72, senses when the cable tension is not with a desired range. A braking device 76, connected to the cable 22 (not shown) and controlled by the high-low threshold device 74, brakes the cable when the tension is too low or too high.

In conclusion, operation of the hydrographic winch having features of this invention has demonstrated that a generally useful, high-speed, high-power winch can be built which is capable of:

a. high line rates and acceleration, provided by the large drive and inherently low inertia of the traction unit 12, b. complete control of the cable 22 in the system, provided by the cable accumulator 14 acting as a buffer between the traction unit 12 and storage drum 16, and cable tension feedback into the control system from the load side; and c. reduced transient power loads on the ship's electrical system, through use of the energy storage capability of the hydraulic system.

In addition, the winch is equipped with controls to automatically compensate for ship's motion with cable motion, so that the suspended load 23 will remain nearly stationary with the respect to the mean sea surface.

d. the use of variable displacement hydraulic motors 49A operating from a pressure source 34 makes energy storage and dissipation easy, and offers the most flexible, controllable system for this application; and e. the position-order control system, with maximum rate control, gives the operator the closest control of the load 23 under all conditions.

We claim:

1. A winch control system, for controlling a winch stationed on a vessel, used for stabilizing a load, which is connectable by a cable to a traction unit driven by a prime mover, at a constant depth below the means surface of the sea irrespective of the vertical motion of the vessel due to wave action, comprising:

a cable dynamics sensor connectable to the cable between the traction unit and the load, for generating two output signals, one signal being proportional to the depth of the sensor and the other signal being proportional to the velocity of the sensor relative to the vessel;

a tachometer, connectable to the traction unit, for producing a signal which is proportional to the velocity of the cable relative to the vessel;

a depth-velocity summing circuit connected to the cable dynamics sensor and adapted to be connected to a sensor depth order signal generated by a control console on the vessel, for summing the sensor depth and depth order signals, and connected to the cable dynamics sensor and tachometer for summing the sensor velocity and cable velocity signals, and then summing the two depth and velocity signals to produce an output control signal; and a torque control adapted to be connected from the output of the depth-velocity summing circuit to the prime mover, for developing a torque signal proportional to the control signal, to cause the traction unit to null the control signal, thereby controlling the load position and velocity.

2. A winch control system according to claim 1, wherein the depth-velocity summing circuit consists of three summers:

1. a depth summer, whose two inputs are the depth order signal and the sensor depth signal, for generating an output depth error signal;

2. a velocity summer, whose two inputs are the signal from the tachometer and the sensor velocity signal, for generating an output velocity error signal; and 3. a depth-velocity summer, having as its two inputs the depth and velocity output error signals, for generating the output control signal.

3. A winch control system according to claim 2, further comprising the following elements mounted on the vessel:

a cable tension monitoring system which includes
a load cell which makes contact with and senses the tension in the cable;
a high-low threshold device, connected to the load cell, which senses when the cable tension is not within a desired range; and
a braking device, connected to the cable and connected to and controlled by the high-low threshold device, which brakes the cable when the tension is too low or when the tension is too high, to avoid slack cable and/or broken cable.

4. A winch control system according to claim 2, further comprising:

the traction unit, mounted on the vessel.

5. A winch control system according to claim 4, wherein the traction unit further comprises:

a pair of capstans grooved for accepting the cable.

6. A winch control system according to claim 5, further comprising:

the prime mover, 1 on the vessel.

7. A winch control system according to claim 6, wherein the prime mover further comprises the following elements mounted on the vessel:

a hydraulic motor with proportional torque control, connected to and controlled by the output of the torque control; and a gear reduction box, connected to and driven by the hydraulic motor, whose output is connected to capstans.